United States Patent [19]
Hori

[11] Patent Number: 5,752,117
[45] Date of Patent: May 12, 1998

[54] RELEASE BUTTON MECHANISM OF CAMERA

[75] Inventor: Masakatsu Hori, Tokyo, Japan

[73] Assignee: Asahi Kogaku Kogyo Kabushiki Kaisha, Tokyo, Japan

[21] Appl. No.: 859,368

[22] Filed: May 20, 1997

[30] Foreign Application Priority Data

May 21, 1996 [JP] Japan ................................. 8-150249

[51] Int. Cl.$^6$ ........................................................ G03B 17/38
[52] U.S. Cl. .................................................................. 396/504
[58] Field of Search ........................................ 396/502, 503, 396/504, 543

[56] References Cited

U.S. PATENT DOCUMENTS

| | | |
|---|---|---|
| 3,918,069 | 11/1975 | Urano ........................................ 396/503 |
| 4,293,210 | 10/1981 | Kando et al. ........................... 396/504 X |
| 4,329,039 | 5/1982 | Kaneko ..................................... 396/502 |

Primary Examiner—Howard B. Blankenship
Attorney, Agent, or Firm—Greenblum & Bernstein P.L.C.

[57] ABSTRACT

A release button mechanism of a camera includes a release button which is movably provided on a camera body and which has a release cable mount, and a release pin which is supported in the release button to move in the same direction as the release button and which is adapted to transmit the movement of the release button and the movement of a release cable attached to the release cable mount. A release button association member is engaged by the release button and rotates together with the release button when the latter rotates in a plane substantially perpendicular to the direction of the movement of the release button. The camera body includes a stop to prevent the release button association member from rotating. The release button association member is provided with a restriction portion which engages with the release pin to prevent the slipping-off of the release pin from the release button.

15 Claims, 6 Drawing Sheets

RELEASE BUTTON MECHANISM OF CAMERA

BACKGROUND OF THE INVENTION

1. Field of the Invention

The present invention relates to a release button mechanism of a camera to which a cable release (wire release) can be attached.

2. Description of the Related Art

In conventional cameras, a release button is provided on the center portion thereof with a threaded through hole portion (internal thread) in which a threaded front end (external thread) of a release cable can be screwed.

A rotation preventing device is provided for preventing the release button from rotating together with the release cable when the front end of the release cable is screwed in or unscrewed from the threaded hole of the release button.

A release pin is received in the through-hole of the release button, so that the release pin moves together with the release button and the movement of the release cable.

Once the camera is assembled, the release pin (at its lower end) abuts against, for example, a contact piece of a release switch, and the release pin does not slip from the release button occurs. However, during assembling or disassembling (e.g., during) of the camera, the release pin may slip from the release button because of the absence of the contact piece of the release switch, resulting in reduced operational efficiency.

To prevent this, a slipping-off preventing device is provided to prevent the release pin from slipping off during assembling or disassembling of the camera.

As can be seen from the foregoing, in conventional cameras, since the rotation preventing device of the release button and the slipping-off preventing device of the release pin are separately provided, the manufacturing costs and the number of assembling operations are increased.

SUMMARY OF THE INVENTION

It is an object of the present invention to provide a simple release button mechanism in which the rotation of the release button and the slipping-off of the release pin can be prevented by a single means (same means), so that the manufacturing costs and the number of the assembling processes can be reduced.

To achieve the object mentioned above, according to the present invention, there is provided a release button mechanism of a camera including a release button which is movably provided on a camera body and which has a release cable mount, and a release pin which is supported in the release button to move in the direction of the movement of the release button and which is adapted to transmit the movement of the release button and the movement of a release cable attached to the release cable mount, wherein the improvement comprises a release button association member which is engaged by the release button and which rotates together with the release button when the latter rotates in a plane substantially perpendicular to the direction of the movement of the release button, and a stop provided on the camera body side to prevent the release button association member from rotating, wherein said release button association member is provided with a restriction portion which engages with the release pin to prevent the slipping-off of the release pin from the release button.

In another aspect of the invention, a release button mechanism comprises a release button to which an external release

2 cable can be attached, a release pin which is supported by the release button, and an association member which is engaged by the release button to prevent the release button from rotating and to prevent the release pin from slipping off from the release button.

The release button is movably provided on a camera body and has a through hole at the axis thereof, with the through hole being provided with an upper internal thread for screw-engaging a release cable, a small diameter stepped portion and lower hole portion having a larger diameter than that of the small diameter stepped portion, in this order from the upper side.

The release pin is slidably inserted in the lower hole portion of the release button, with the release pin being provided with an upper head portion and a lower small diameter portion having a smaller diameter than that of the upper head portion.

A pair of grooves formed on the lower hole portion of the release button in a plane perpendicular to the axis of the release button go through into the lower hole portion.

A release button association plate has a rectangular groove portion which is engaged in the above mentioned pair of grooves and protrudes in the lower hole portion, where the inner edges of the rectangular groove portion abut against the head portion of the release pin to prevent the release pin from slipping off from the release button. The release button association plate is prevented from moving by a stop mechanism.

The present disclosure relates to subject matter contained in Japanese Patent Application No. 08-150249 (filed on May 21, 1996) which is expressly incorporated herein by reference in its entirety.

BRIEF DESCRIPTION OF THE DRAWINGS

The invention is described below in detail with reference to the accompanying drawings, in which.

DESCRIPTION OF THE PREFERRED EMBODIMENTS

A release button mechanism 2 of a camera 12 includes a release button 4, a release pin 6, a release button association plate 8, and a stop 10. The release button 4 is linearly and movably inserted in a center through hole 1602 formed in a dial 16. The dial 16 is rotatably attached to a body cover 14 of the camera 12 to set photographing parameters such as shutter speed, etc.

Figure 3:
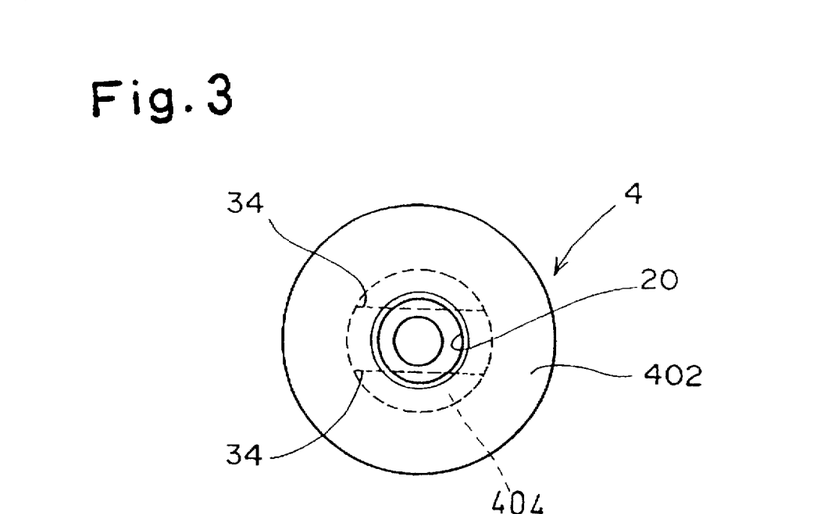
FIG. 3 is a plan view of a release button.
Figure 4:
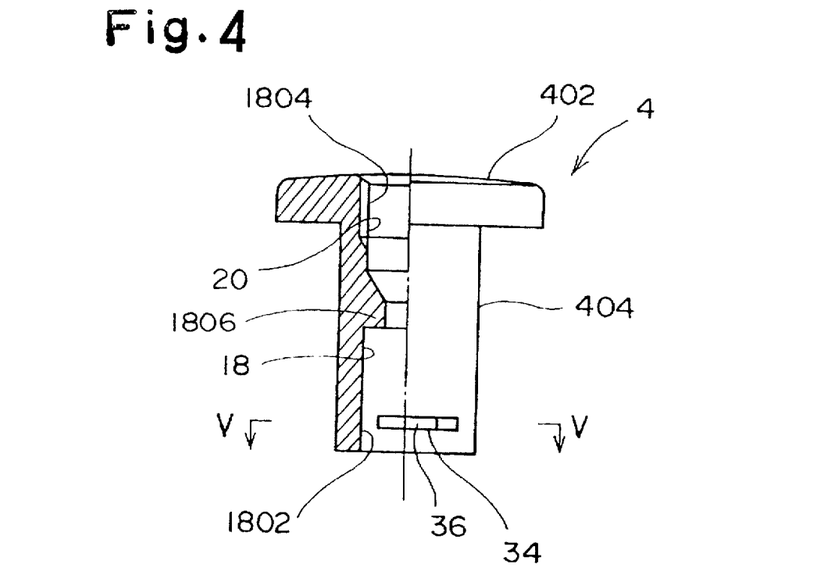
FIG. 4 is a front elevational view of a release button in which the left half is a sectional view.

As shown in FIGS. 3 and 4, the release button 4 includes a head portion 402 and a shaft portion 404 having a diameter smaller than that of the head portion 402. The shaft portion 404 is movably inserted in the through hole 1602 of the dial 16. The downward movement of the release button 4 is restricted when the lower surface of the head portion 402 abuts a bottom surface 1608 of a recess formed at the upper end of the through hole 1602 (FIG. 1)

The release button 4 is provided with a center through hole 18. The center through-hole 18 is provided in turn with a small diameter stepped portion 1806 on the middle portion in the axial direction, with an upper hole portion located on the stepped portion 1806, and with a lower hole portion 1802 defined below the stepped portion 1806. The upper hole portion is provided with an internal thread 1804, which constitutes an external release mount 20.

Figure 6:
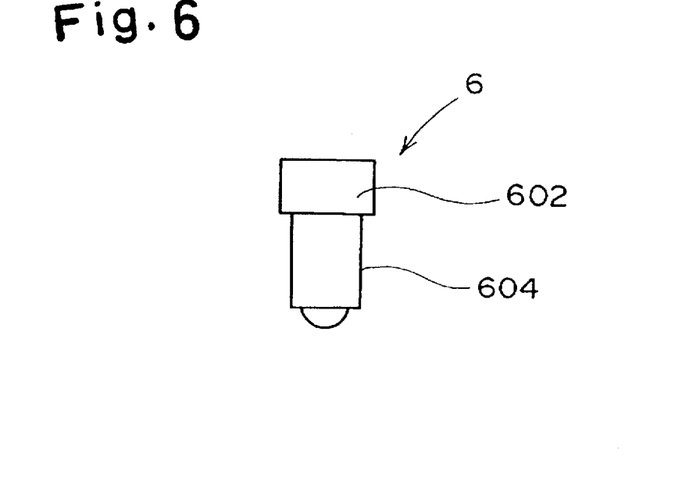
FIG. 6 is a front elevational view of a release pin.

The release pin 6 is fitted in the lower hole portion 1802 of the release button 4 to move in the same direction as the release button 4. As shown in FIG. 6, the release pin 6 is provided with a head portion 602 and a small diameter shaft portion 604 having a diameter smaller than that of the head portion 602. The upward movement of the release pin 6 (which is slidably inserted in the lower hole portion 1802 of the release button 4, with the head portion 602 being located upward) is restricted when the head portion 602 abuts the stepped portion 1806 of the through-hole 18.

Figure 1:
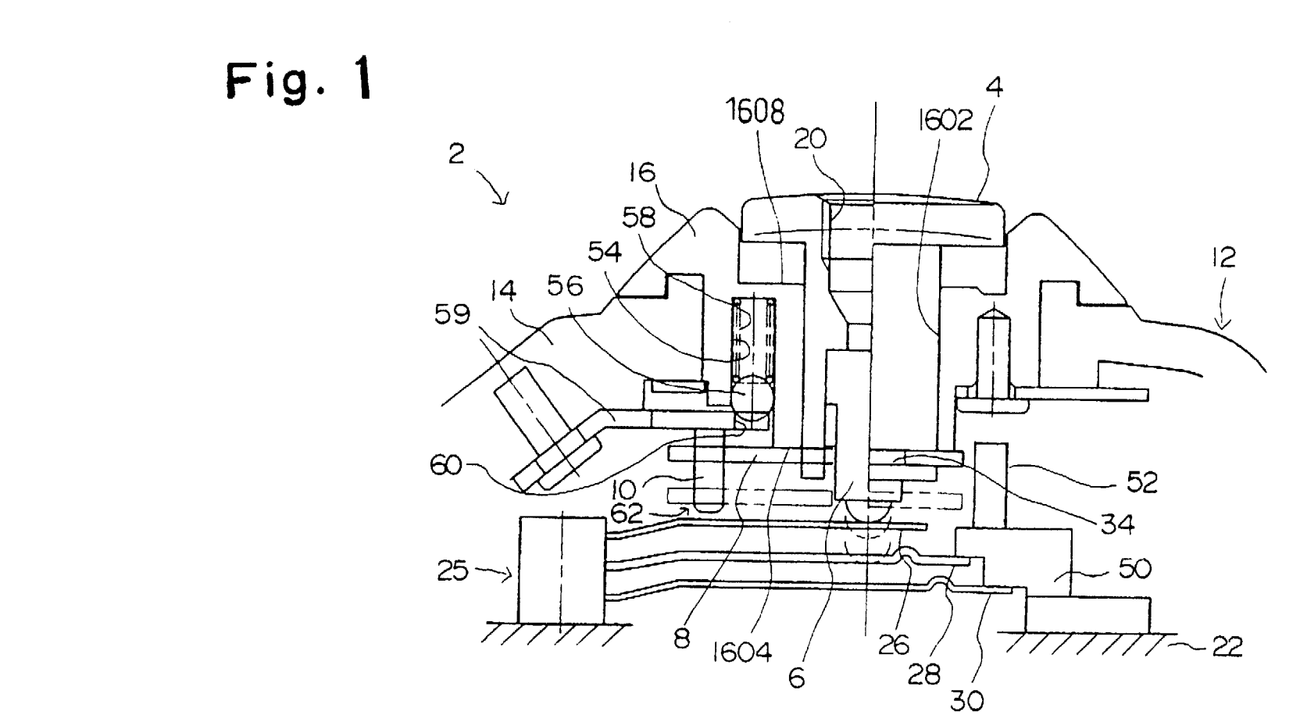
FIG. 1 is a sectional front view of a release button mechanism of a camera according to the present invention.
Figure 2:
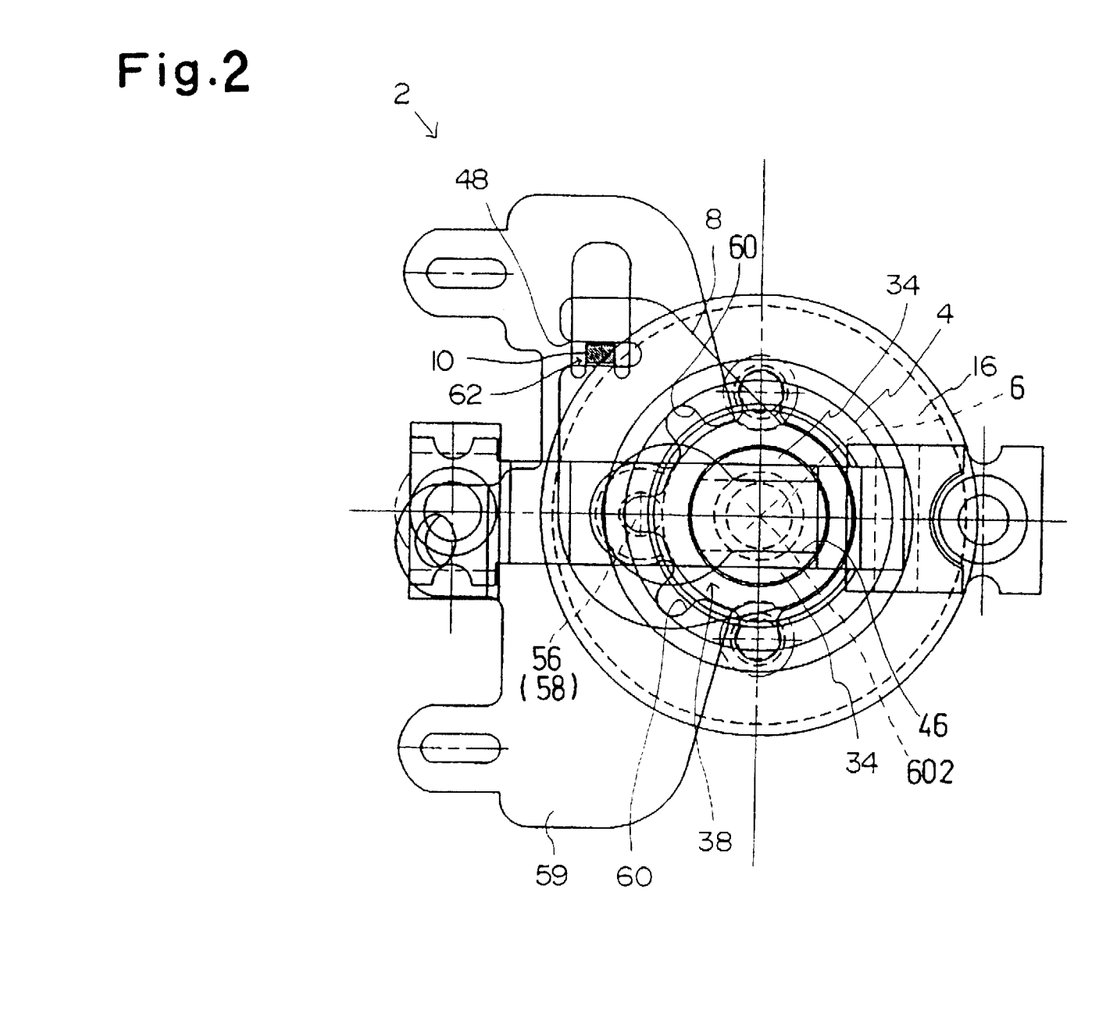
FIG. 2 is a plan view of a release button mechanism of a camera according to the present invention.

As shown in FIG. 1, a release switch 25 supported by the camera body 22 is provided below the release button 4. The release switch 25 is provided with three resilient contact pieces 26, 28 and 30, each of which can be elastically deformed. The lower end of the release pin 6 elastically contacts the contact piece 26 so that the release pin 6 is biased upward by the contact piece 26. Thus, the release button 4 is biased upward through the head portion 602 of the release pin 6 and the stepped portion 1806 of the release button 4.

When the release button 4 is depressed, the release pin 6 is moved downward together with the release button 4 (via the head portion 602 and the stepped portion 1806) to move the contact piece 26 downward. Consequently, the contact pieces 26 and 28 come into contact with each other, e.g., actuating a photometering operation for an automatic exposure. When further depression of the release button 4 takes place, the contact piece 28 comes into contact with the contact piece 30, e.g., actuating a shutter operation.

Figure 5:
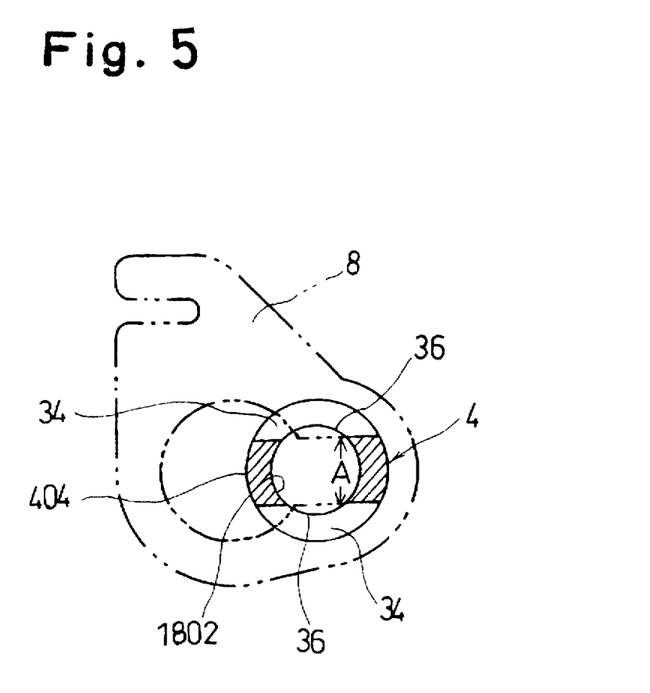
FIG. 5 is a sectional view taken along the line V—V in FIG. 4.

As shown in FIGS. 3 through 5, the shaft portion 404 of the release button 4 is provided with a pair of grooves (slits) 34 which lie in a plane perpendicular to the axis of the shaft portion 404, and which are diametrically opposed to each other (with respect to the axis of the release button 4). The grooves 34 define respective openings 36 which open into the lower hole portion 1802 of the release button 4. That is, a distance A (FIG. 5) between the two grooves 34 is smaller than the inner diameter of the lower hole portion 1802, and the diameter of the head portion 602 of the release pin 6. At the same time, the distance A is larger than the shaft portion 604 of the release pin 6.

Figure 7:
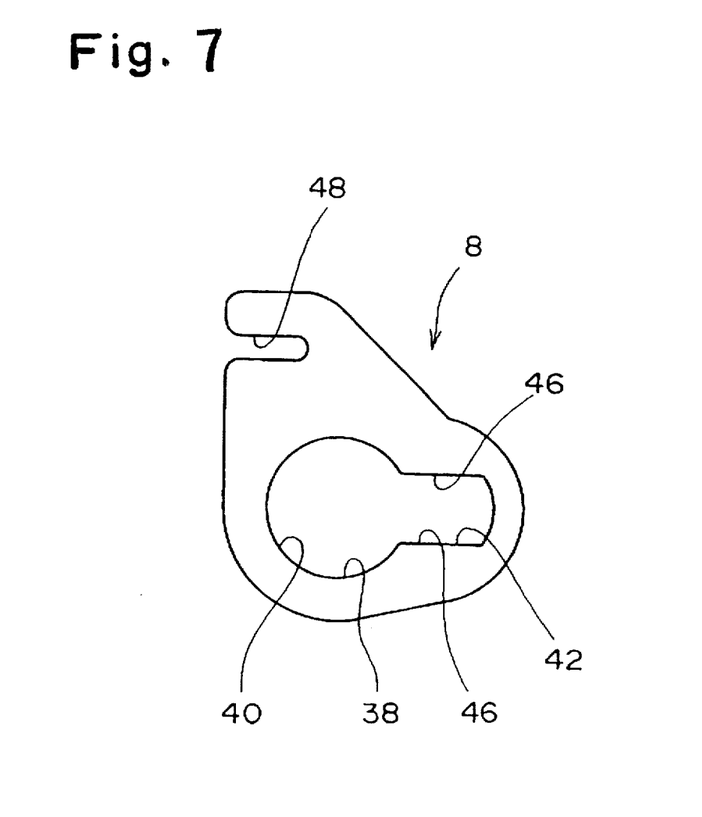
FIG. 7 is a plan view of a release button association plate shown in FIG. 1; and, FIG. 8 is a plan view of a click plate.

As shown in FIGS. 5 and 7, a release button association plate 8 is provided with an opening 38 in the form of a keyhole. The opening 38 includes a circular portion 40 and a rectangular portion 42 connected to the circular portion 40. The diameter of the circular portion 40 is larger than the diameter of the shaft portion 404 of the release button 4. The distance between the parallel rectilinear sides 46 of the rectangular portion 42 is substantially identical to the distance A between the two grooves 34.

The association plate 8 is also provided with a cut-away portion (recess) 48 at a periphery thereof, separate from the circular portion 40.

The release button association plate 8 is attached to the release button 4 by engaging the rectangular portion 42 of the keyhole opening 38 in the grooves 34 of the release button 4. That is, firstly, the shaft portion 404 of the release button 4 is inserted in the circular portion 40 of the opening 38. Then, the plate 8 is moved to insert the shaft portion 404 into the rectangular portion 42 to thereby engage the rectilinear sides 46 of the rectangular portion 42 in the grooves 34 of the release button 4.

When the release button association plate 8 is attached to the release button 4, the axial movement of the release button 4 causes the plate 8 to move, and the rotation of the release button 4 causes the plate 8 to rotate.

The release button 4 is biased upward via the contact piece 26 and the release pin 6, as mentioned above. When the plate 8 abuts the lower surface 1604 of the dial 16, the upper position (in the range of upward movement) of the release button 4 is restricted, thereby preventing the release button 4 from being disengaged from the dial 16.

When the release button association plate 8 is attached to the release button 4, the rectilinear sides 46 of the rectangular portion 42 project into the lower hole portion 1802 of the release button 4 through the openings 36 of the grooves 34 (since the distance between the rectilinear sides 46 is substantially identical to the distance A between the grooves 34). Therefore, the parallel rectilinear sides 46 are located below the head portion 602 of the release pin 6, and prevent the release pin 6 from slipping off from the release button 4 when the head portion 602 abuts the parallel rectilinear sides 46.

It should be noted that the camera body 22 is provided with a position restriction member 50 which defines the upper position of the contact pieces 28 and 30, and on which a second stop 52 is provided. The second stop 52 prevents the release button association plate 8 from moving in a direction where the circular portion 40 of the plate 8 would move toward the release button 4.

The dial 16 is provided with a spring hole 54, which extends upwardly from the bottom of the dial 16, and in which a spring 58 and a ball 56 are provided. The ball 56 is biased downwardly by the spring 58 in the spring hole 54.

Figure 8:
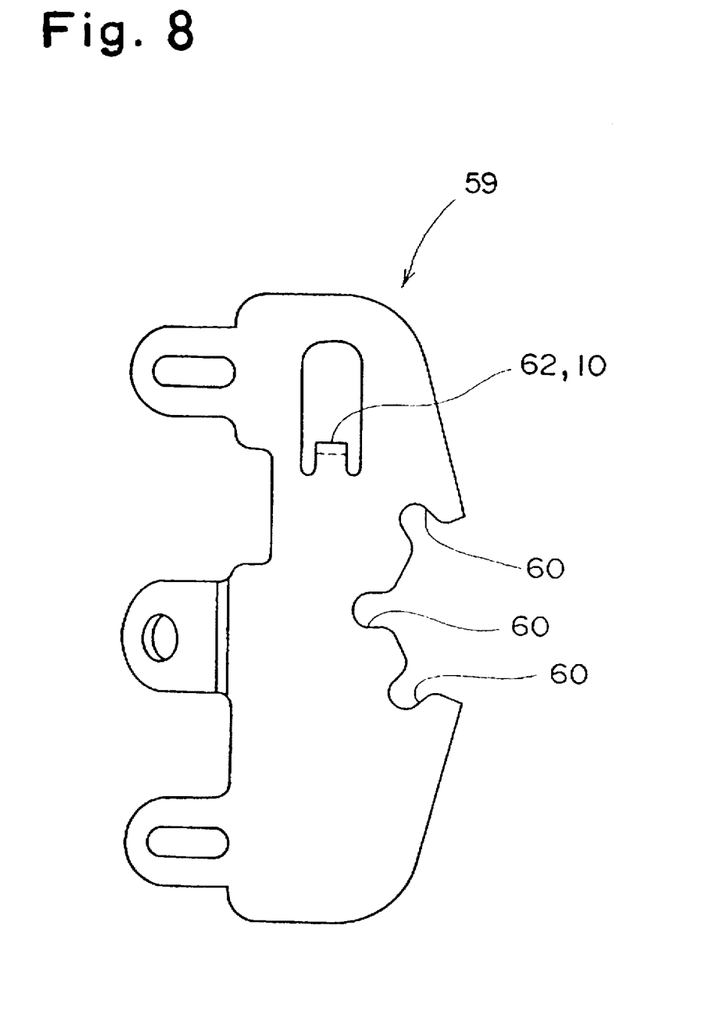

A click plate 59 is attached to the body cover 14 below the dial 16. The click plate 59 is provided (on an outer peripheral edge opposing the outer peripheral surface of the shaft portion 404 of the release button 4) with three recesses 60 (FIG. 8) spaced in the circumferential direction of the shaft portion 404. The ball 56 can be selectively engaged in one of the recesses 60.

The click plate 59 is also provided with a downward bent portion (stop piece) 62 which constitutes a stop 10. The stop piece 62 is inserted in the recess 48 of the release button association plate 8. The length of the stop piece 62 is such that when the release button association plate 8 is moved downwardly together with the release button 4 (which is moved to the lower most position), the stop piece 62 engages with the plate 8.

To attach the external release (cable release) to the release button 4, the front end of the cable release is screwed in the threaded hole 1804 of the release mount 18. At that moment, the rotation is transmitted to the release button 4, so that it tends to rotate. Also, the release button association plate 8 tends to rotate together with the release button 4. Nevertheless, since the stop piece 62 is engaged in the recess 48, no rotation of the release button association plate 8 occurs, and hence no rotation of the release button 4 occurs. Thus, the cable release can be smoothly screwed into or disengaged from the release button 4.

Upon assembling or disassembling, the body cover 14 is removed from the camera body 22, and the release switch 25 is moved away from the release button mechanism 2. Consequently, without the release button mechanism according to the invention, the release pin 6 tends to come out from the release button 4 due to the absence of the contact piece 26 with which the lower end of the release pin 6 has engaged.

However, in the release button mechanism 2 of the camera 12, since the lower surface of the head portion 602 of the release pin 6 abuts against the rectilinear sides 46 of the rectangular portion 42 of the opening 38 of the release button association plate 8 that protrude into the inside of the release button 4, the release pin 6 does not slip from the release button 4.

As can be seen from the foregoing, in the release button mechanism 2 of the camera 12 according to the present embodiment, since the release button association plate 8 (attached to the release button 4) prevents the rotation of the release button 4 and the slipping-off of the release pin 6, the manufacturing cost and number of assembling processes can be reduced (in comparison with the prior art in which rotation prevention mechanism for the release button 4 and the slipping-off prevention mechanism for the release pin 6 must be separately provided). Moreover, in the illustrated embodiment, the release button association plate 8 is also adapted to prevent the release button 4 from being disengaged from the dial 16, further reducing manufacturing costs and the number of assembling processes.

Although the rotation of the release button 4 and the slipping-off of the release pin 6 are prevented by the release button association plate 8 in the illustrated embodiment, it is possible to provide a pair of pin members in the grooves 34 instead of the plate 8. In this alternative embodiment, the pin members abut the stop 10 to prevent the release button 4 from rotating, and the head portion 602 of the release pin 6 abuts at its lower surface against the pin members to prevent the release pin 6 from slipping off from the release button 4.

Moreover, it is possible to provide the stop piece 62 on a portion other than the click plate 59. Furthermore, the stop piece 62 may be provided with a stop function to restrict the movement of the plate 8 toward the rectangular opening 42, in addition to preventing the rotation of the release button association plate 8, so that the separate stop 52 (second stop) can be eliminated.

As may be understood from the above discussion, according to the present invention, since the association member is provided on the release button to prevent the release button from rotating and the release pin from slipping off, the manufacturing costs and the number of assembling processes can be reduced in comparison with the prior art (in which the rotation prevention mechanism for the release button and the slipping-off prevention mechanism for the release pin are separately provided).

What is claimed is:

1. A release button mechanism of a camera comprising:
   a release button movably provided on a camera body and having a release cable mount;
   a release pin supported in said release button to move with the release button and adapted to transmit movement of the release button and movement of a release cable attached to said release cable mount;
   a release button association member engaged with said release button such that when the release button rotates about an axis of the release button, the release button association member rotates together with the release button;
   a stop provided on the camera body side to prevent said release button association member from rotating; and
   a restriction portion provided to said release button association member, said restriction portion being engaged with said release pin to prevent the release pin from slipping from the release button.

2. The release button mechanism according to claim 1, wherein said release button association member is connected to said release button to move together with axial movement of said release button.

3. The release button mechanism according to claim 1, wherein said release button association member engages the camera body to prevent the release button from slipping off from the camera body side.

4. The release button mechanism according to claim 1, wherein the release pin is biased toward said release button so that the release button is biased in a direction projecting from the camera body.

5. The release button mechanism according to claim 1, wherein said release button is provided with a through-hole formed along an axis of the release button, and wherein the release cable mount is provided in an upper portion of the through-hole, and the release pin is received in a lower portion of the through-hole.

6. The release button mechanism according to claim 1, wherein said release button association member comprises a plate that lies in a plane perpendicular to an axis of the release button.

7. The release button mechanism according to claim 6, wherein said release button has a groove formed therein that lies in a plane perpendicular to the axis of the release button, so that a part of the plate engages with the groove, said groove being formed in a side portion of said release button.

8. The release button mechanism according to claim 1, wherein said release button is provided with a through-hole formed along an axis of the release button, said release cable mount being provided in an upper portion of the through-hole, said release pin being received in a lower portion of the through-hole, said release pin being provided with a head portion slidably fitted in the through-hole and a shaft portion having a diameter smaller than that of the head portion, said release pin being received in the through-hole so that the head portion is located in the inner portion of the through-hole, said release button association member including a plate that lies in a plane substantially perpendicular to the axis of the release button, said release button being provided on the side portion thereof with a groove that lies in a plane substantially perpendicular to the axis of the release button and connected to the through-hole, whereby the slipping of the release pin from the release button is prevented by the engagement of a part of the plate in the groove and the engagement of the head portion with the plate.

9. The release button mechanism according to claim 1, further comprising a second stop that restricts the movement of the release button association member in a direction substantially perpendicular to an axis of the release button.

10. The release button mechanism according to claim 1, wherein the camera includes a rotatable dial adapted to set a photographing parameter, said release button being movably fitted in a center through-hole formed in said dial, said dial being provided on a lower end surface with a recess in which a ball biased downward is received, and the camera being provided with a click plate having a plurality of cut-away portions in which the ball can be selectively engaged.

11. The release button mechanism according to claim 10, wherein said stop is provided on the camera body side to prevent said release button association member from rotating, and said stop being formed by bending a part of said click plate.

12. The release button mechanism according to claim 3, wherein said camera includes a rotatable dial adapted to set a photographing parameter, said release button being movably received in a center through hole formed in the dial, whereby the slipping of the release button from the camera body is prevented by the engagement of the release button association member with the lower portion of the dial.

13. A release button mechanism of a camera, comprising:

a release button to which an external release cable can be attached;

a release pin supported by said release button; and a single association member engaged by said release button to prevent the release button from rotating and to prevent the release pin from slipping from the release button.

14. The release button mechanism according to claim 13, wherein said association member engages a camera body of the camera to prevent the release button from slipping from the camera body.

15. A release button mechanism of a camera comprising:

a release button movably provided on a camera body and having a through-hole formed therein at an axis of the release button, said through-hole formed with an upper internal thread for screw-engaging a release cable, a small diameter stepped portion, and a lower hole portion having a larger diameter than that of said small diameter stepped portion, in order from upper side of said through-hole;

a release pin slidably inserted in said lower hole portion of the release button, said release pin being provided with an upper head portion and a lower small diameter portion having a smaller diameter than that of said upper head portion;

a pair of grooves formed on said lower hole portion of the release button in a plane perpendicular to the axis of the release button, said pair of grooves extending into said lower hole portion;

a release button association plate having a rectangular groove portion formed therein engaging said pair of grooves and protruding in said lower hole portion, inner edges of said rectangular groove portion abutting said head portion of the release pin to prevent the release pin from slipping off from the release button; and a stop mechanism that prevents said release button association plate from rotating.

* * * * *